United States Patent
Yazaki et al.

(10) Patent No.: US 11,239,735 B2
(45) Date of Patent: Feb. 1, 2022

(54) MOTOR UNIT AND MOTOR UNIT MANUFACTURING METHOD

(71) Applicants: HONDA MOTOR CO., LTD., Tokyo (JP); Hitachi Automotive Systems, Ltd., Hitachinaka (JP)

(72) Inventors: Manabu Yazaki, Wako (JP); Tomoyuki Suzuki, Wako (JP); Sachio Kawada, Hitachinaka (JP); Yasuyuki Saito, Hitachinaka (JP); Hiroshi Hamano, Hitachinaka (JP); Tsuyoshi Harada, Hitachinaka (JP)

(73) Assignees: HONDA MOTOR CO., LTD., Tokyo (JP); Hitachi Automotive Systems, Ltd., Hitachinaka (JP)

( * ) Notice: Subject to any disclaimer, the term of this patent is extended or adjusted under 35 U.S.C. 154(b) by 35 days.

(21) Appl. No.: 16/813,927

(22) Filed: Mar. 10, 2020

(65) Prior Publication Data

US 2020/0295642 A1    Sep. 17, 2020

(30) Foreign Application Priority Data

Mar. 12, 2019   (JP) .............................. JP2019-045189

(51) Int. Cl.
| | | |
|---|---|---|
| *H02K 16/00* | (2006.01) | |
| *H02K 21/22* | (2006.01) | |
| *H02K 7/10* | (2006.01) | |
| *H02K 37/12* | (2006.01) | |

(52) U.S. Cl.
CPC .............. *H02K 21/22* (2013.01); *H02K 7/10* (2013.01); *H02K 37/12* (2013.01)

(58) Field of Classification Search
CPC ......... H02K 16/00; H02K 5/225; H02K 11/33
See application file for complete search history.

(56) References Cited

U.S. PATENT DOCUMENTS

| | | | | |
|---|---|---|---|---|
| 5,528,094 A | * | 6/1996 | Hasebe | B60K 17/16 310/112 |
| 6,198,183 B1 | * | 3/2001 | Baeumel | F04D 25/068 310/52 |

FOREIGN PATENT DOCUMENTS

JP    2000-116082    4/2000

* cited by examiner

*Primary Examiner* — Dang D Le

(74) *Attorney, Agent, or Firm* — Amin, Turocy & Watson, LLP

(57) ABSTRACT

A motor unit includes: a first rotating electric machine which includes a cylindrical first stator, a first rotor disposed coaxially with the first stator, a first shaft disposed coaxially with the first rotor, and a cylindrical first casing accommodating the first stator and the first rotor; a second rotating electric machine which includes a cylindrical second stator, a second rotor disposed coaxially with the second stator, a second shaft disposed coaxially with the second rotor, and a cylindrical second casing accommodating the second stator and the second rotor; a single drive device which is integrally fixed across a peripheral surface in a diameter direction of the first rotor in the first casing and a peripheral surface in a diameter direction of the second rotor in the second casing; and a surface-matching fixing portion which is fixed by a fixing member while an axial end surface of the first casing comes into contact with an axial end surface of the second casing.

5 Claims, 11 Drawing Sheets

MOTOR UNIT AND MOTOR UNIT MANUFACTURING METHOD

CROSS-REFERENCE TO RELATED APPLICATION

Priority is claimed on Japanese Patent Application No. 2019-045189, filed on Mar. 12, 2019, the contents of which are incorporated herein by reference.

BACKGROUND OF THE INVENTION

Field of the Invention

The present invention relates to a motor unit and a motor unit manufacturing method.

Description of Related Art

In a rotating electric machine mounted on a hybrid vehicle, an electric vehicle, or the like, when a current is supplied to a coil, a magnetic field is formed in a stator core and magnetic attraction and repulsion are generated between a rotor (for example, a magnet rotor, a salient pole iron rotor, and a cage rotor) and the stator core. Accordingly, the rotor rotates with respect to the stator.

For example, Japanese Unexamined Patent Application, First Publication No. 2000-116082 discloses an outer rotor type outer peripheral drive type electric motor. According to Japanese Unexamined Patent Application, First Publication No. 2000-116082, in the outer peripheral drive type electric motor, two stators are coaxially connected in the axial direction, two bearings are provided in the middle of the two stators, and an outer rotor is connected to the two bearings. Further, a bolt is inserted through two stators along the axes so that two stators are coupled to each other.

SUMMARY OF THE INVENTION

However, since the bolt protrudes toward the outside of an axial end portion of the stator, there is a possibility that the electric motor may increase in size.

Therefore, there is room for improvement in reducing the size of the electric motor.

An aspect of the present invention has been made in view of the above-described circumstances and an object thereof is to provide a motor unit and a motor unit manufacturing method capable of realizing miniaturization.

In order to solve the above-described problems and achieve the object, the present invention employs the following aspects.

(1) A motor unit according to an aspect of the present invention includes: a first rotating electric machine which includes a cylindrical first stator, a first rotor disposed coaxially with the first stator, a first shaft disposed coaxially with the first rotor, and a cylindrical first casing accommodating the first stator and the first rotor; a second rotating electric machine which includes a cylindrical second stator, a second rotor disposed coaxially with the second stator, a second shaft disposed coaxially with the second rotor, and a cylindrical second casing accommodating the second stator and the second rotor; a single drive device which is integrally fixed across a peripheral surface in a diameter direction of the first rotor in the first casing and a peripheral surface in a diameter direction of the second rotor in the second casing; and a surface-matching fixing portion which is fixed by a fixing member while an axial end surface of the first casing comes into contact with an axial end surface of the second casing.

(2) In the aspect (1), the surface-matching fixing portion may be fixed in an axial direction, a portion facing the drive device in the peripheral surface of the first casing and the peripheral surface of the second casing may have a planar flat portion extending in the axial direction, and the motor unit may further include an orthogonal fixing portion which fixes the drive device in a direction orthogonal to the axial direction across the peripheral surface of the first casing and the peripheral surface of the second casing.

(3) In the aspect (2), the surface-matching fixing portion may include a first flange which protrudes outward in the diameter direction from an axial end surface of the first casing and a second flange which protrudes outward in the diameter direction from an axial end surface of the second casing and the first flange and the second flange may be fastened by a bolt serving as the fixing member while both flanges come into contact with each other.

(4) In any one of the aspects (1) to (3), the first rotating electric machine and the second rotating electric machine may be disposed coaxially and a plurality of the fixing members may be arranged at intervals in a circumferential direction of the first rotating electric machine.

(5) In the aspect (4), the drive device may cover at least a part of the plurality of fixing members while the drive device is fixed.

(6) A motor unit manufacturing method according to another aspect of the present invention includes: a first step of preparing a first rotating electric machine which includes a cylindrical first stator, a first rotor disposed coaxially with the first stator, a first shaft disposed coaxially with the first rotor, and a cylindrical first casing accommodating the first stator and the first rotor, a second rotating electric machine which includes a cylindrical second stator, a second rotor disposed coaxially with the second stator, a second shaft disposed coaxially with the second rotor, and a cylindrical second casing accommodating the second stator and the second rotor, a single drive device which has a size across a peripheral surface in a diameter direction of the first rotor in the first casing and a peripheral surface in a diameter direction of the second rotor in the second casing, and a surface-matching fixing portion which is fixed by a fixing member while an axial end surface of the first casing comes into contact with an axial end surface of the second casing, and fixing the surface-matching fixing portion by the fixing member; and a second step of fixing the drive device across the peripheral surface of the first casing and the peripheral surface of the second casing after the first step.

According to the aspect (1), since the surface-matching fixing portion which is fasted by the fixing member while the axial end surface of the first casing comes into contact with the axial end surface of the second casing is provided, the fixing member is disposed in the surface-matching fixing portion (the axial center portion of the motor unit). That is, the fixing member does not protrude toward the outside of the axial end portion of the motor unit. Thus, the motor unit can be decreased in size. Additionally, since the single drive device which is integrally fixed across the peripheral surface in the diameter direction of the first rotor in the first casing and the peripheral surface in the diameter direction of the second rotor in the second casing is provided, the drive device does not protrude toward the outside of the axial end portion of the motor unit. Thus, it is possible to decrease the size of the motor unit including two rotating electric machines and the single drive device.

According to the aspect (2), since the surface-matching fixing portion is fastened in the axial direction, the first casing and the second casing can be connected in the axial direction. Additionally, since a portion facing the drive device in the peripheral surface of the first casing and the peripheral surface of the second casing includes a planar flat portion extending in the axial direction, at least a part of the drive device can be disposed along the flat portion and hence the motor unit can be also decreased in size in the diameter direction. In addition, since the orthogonal fixing portion which fixes the drive device in a direction orthogonal to the axial direction across the peripheral surface of the first casing and the peripheral surface of the second casing is further provided, the peripheral surface of the first casing and the peripheral surface of the second casing can be connected to the drive device in a direction orthogonal to the axial direction. Thus, the motor unit can be further decreased in size by the fixing in the axial direction and the fixing in a direction orthogonal to the axial direction.

According to the aspect (3), since the surface-matching fixing portion includes the first flange protruding outward in the diameter direction from the axial end surface of the first casing and the second flange protruding outward in the diameter direction from the axial end surface of the second casing and the first flange and the second flange are coupled to each other by the bolt serving as the fixing member while both flanges come into contact with each other, the following effects are obtained. Due to the surface matching between the first flange and the second flange and the fastening of the bolt, the more reliable connection can be performed and the assembling workability can be improved.

According to the aspect (4), since the first rotating electric machine and the second rotating electric machine are disposed coaxially, the motor unit can be made as small as possible in the diameter direction. Further, since the plurality of fixing members are arranged at intervals in the circumferential direction of the first rotating electric machine, it is possible to prevent a part of the surface-matching fixing portion from excessively increasing in size. Thus, it is possible to further decrease the size of the motor unit.

According to the aspect (5), since the drive device covers at least a part of the plurality of fixing members while the drive device is fixed, it is easy to decrease the size of the motor unit as compared with a case in which the entire fixing member protrudes outward while the drive device is fixed.

According to the aspect (6), since the first step of fixing the surface-matching fixing portion by the fixing member and the second step of fixing the drive device across the peripheral surface of the first casing and the peripheral surface of the second casing after the first step are provided, it is possible to improve the assembling workability of the motor unit and to realize a decrease in size thereof due to the relation to the assembly procedure and the configuration.

DETAILED DESCRIPTION OF THE INVENTION

Hereinafter, embodiments of the present invention will be described with reference to the drawings. In the embodiments, a motor unit including a rotating electric machine (a traveling motor) mounted on a vehicle such as a hybrid vehicle or an electric vehicle will be described as an example.

First Embodiment

Motor Unit 100

Figure 1:
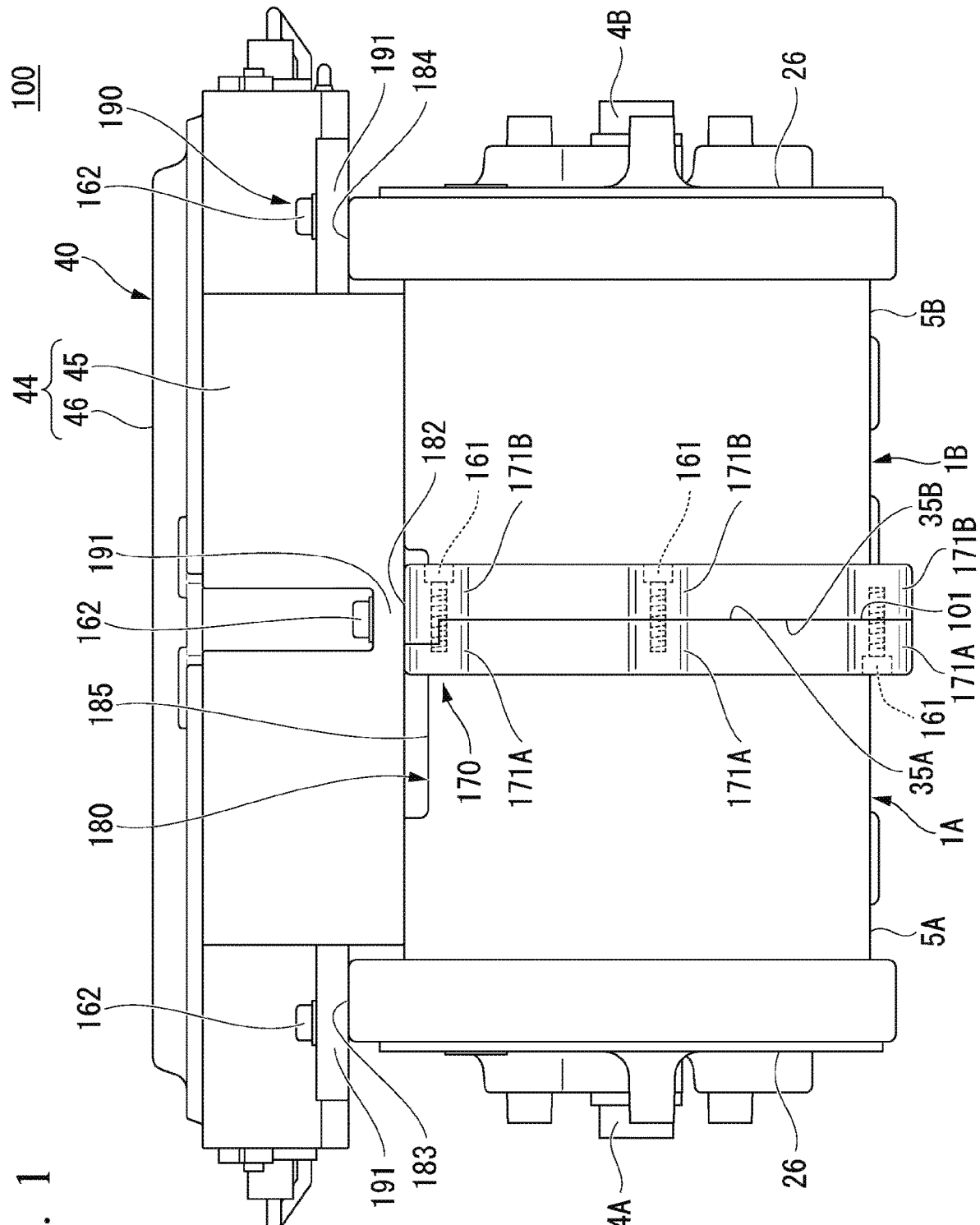
FIG. 1 is a schematic view showing a motor unit according to an embodiment.

FIG. 1 is a schematic view of a motor unit 100 according to a first embodiment.

Figure 3:
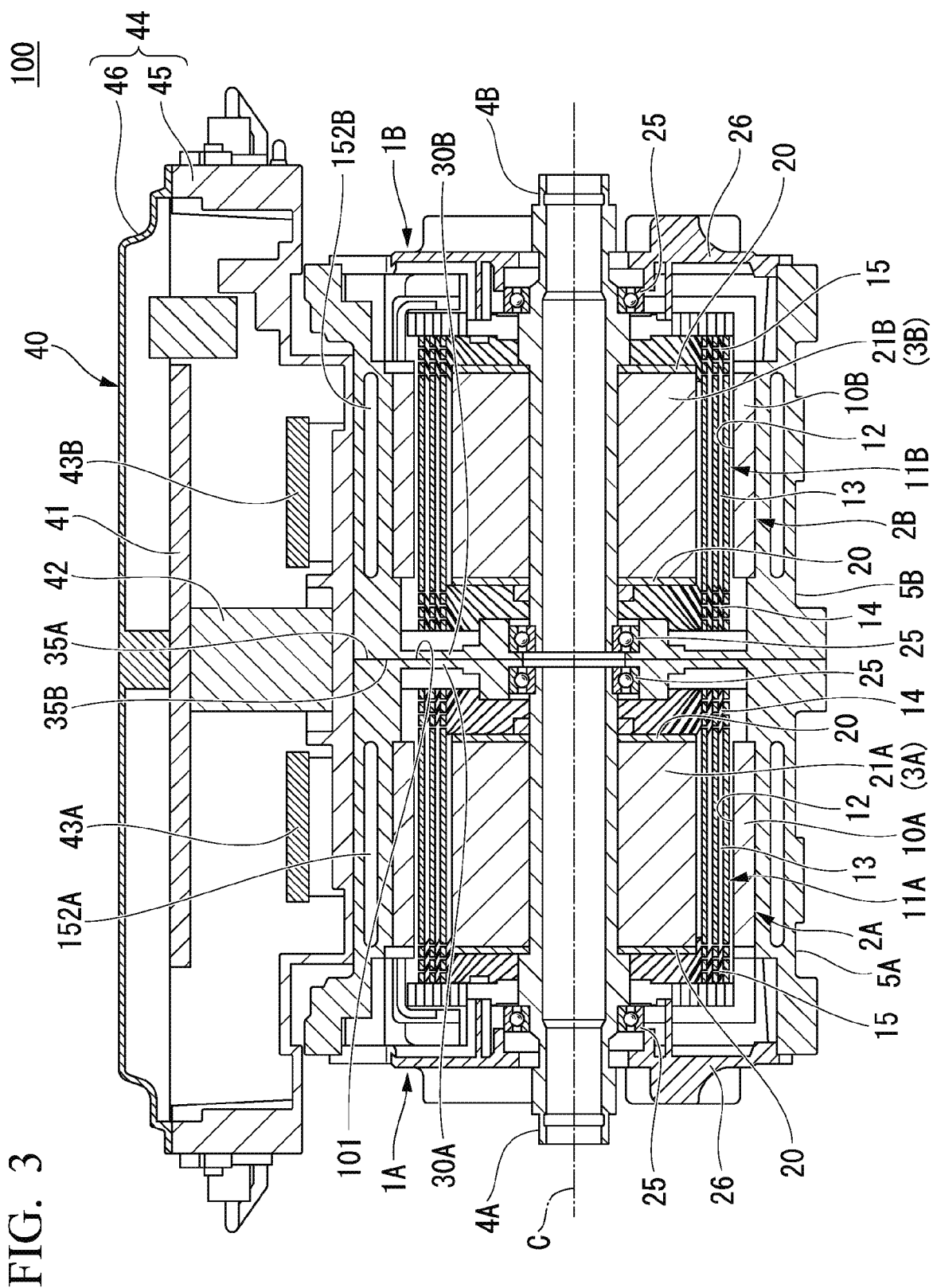
FIG. 3 is a cross-sectional view showing the motor unit in a cross-section of FIG. 2.

As shown FIG. 1, the motor unit 100 is a twin motor unit including two rotating electric machines 1A and 1B. As shown in FIG. 3, two rotating electric machines 1A and 1B are the first rotating electric machine 1A and the second rotating electric machine 1B disposed coaxially with the first rotating electric machine 1A. The first rotating electric machine 1A and the second rotating electric machine 1B are disposed so as to be independently rotatable. Hereinafter, a direction along an axis C of the rotating electric machine is referred to as an "axial direction", a direction orthogonal to the axis C is referred to as a "diameter direction (radial direction)", and a direction around the axis C is referred to as a "circumferential direction".

In this embodiment, the motor unit 100 is disposed so that the axis C follows the horizontal direction. In the following description, the components of the first rotating electric machine 1A may be denoted by "A" at the end of the reference numerals and the components of the second rotating electric machine 1B may be denoted by "B" at the end of the reference numerals.

First Rotating Electric Machine 1A

The first rotating electric machine 1A includes a cylindrical first stator 2A, a first rotor 3A disposed coaxially with the first stator 2A, a first shaft 4A disposed coaxially with the first rotor 3A, and a cylindrical first casing 5A accommodating the first stator 2A and the first rotor 3A.

First Stator 2A

The first stator 2A includes a first stator core 10A and first coils 11A of a plurality of layers (for example, U-phase, V-phase, and W-phase) mounted on the first stator core 10A. The first stator core 10A generates a magnetic field by allowing a current to flow in the first coil 11A.

The first stator core 10A has a cylindrical shape disposed coaxially with the axis C. The first stator core 10A is fixed to the first casing 5A. The first stator core 10A includes a plurality of slots 12 arranged in the circumferential direction. For example, the first stator core 10A is formed by laminating a plurality of electromagnetic steel sheets (silicon steel sheets) in the axial direction. Additionally, the first stator core 10A may be a so-called dust core obtained by compression-molding a metal magnetic powder (soft magnetic powder).

The first coil 11A is inserted into the slot 12. The first coil 11A has a plurality of conductors arranged in the circumferential direction. For example, the first coil 11A is a so-called SC winding (segment conductor coil) in which a U-shaped conductor is inserted into the slot 12 so that one side is a closed segment and the other side is an open segment. The first coil 11A includes an insertion portion 13 which is inserted into the slot 12 of the first stator core 10A, a first coil end 14 which protrudes toward one side of the first stator core 10A in the axial direction (the inside of the motor unit 100 in the axial direction), and a second coil end 15 which protrudes toward the other side of the first stator core 10A in the axial direction (the outside of the motor unit 100 in the axial direction).

First Rotor 3A

The first rotor 3A is radially disposed inward with respect to the first stator 2A with a gap interposed therebetween. The first rotor 3A is fixed to the first shaft 4A. The first rotor 3A is configured to be rotatable around the axis C integrally with the first shaft 4A. The first rotor 3A includes a first rotor core 21A and a magnet (not shown). For example, the magnet is a permanent magnet. Reference numeral 20 in the drawing denotes an end surface plate disposed at both ends of the first rotor 3A in the axial direction.

The first rotor core 21A has a cylindrical shape disposed coaxially with the axis C. The first rotor core 21A is formed by laminating a plurality of electromagnetic steel sheets (silicon steel sheets) in the axial direction. Additionally, the first rotor core 21A may be a so-called dust core obtained by compression-molding a metal magnetic powder (soft magnetic powder).

First Shaft 4A

The first shaft 4A has a hollow structure opening in the axial direction. The axial center portion of the first shaft 4A is fixed into the first rotor core 21A in the diameter direction by press-fitting. Both end portions of the first shaft 4A in the axial direction are supported by a bearing 25 inside the first casing 5A.

First Casing 5A

The first casing 5A includes an end wall 30A provided at one end portion of the first shaft 4A. The end wall 30A faces the first coil end 14 in the axial direction. Reference numeral 26 in the drawing denotes a cover which is provided in the other end portion of the first shaft 4A and covers the second coil end 15 from the axial direction. The first casing 5A includes a first refrigerant path 152A which cools the first stator 2A from the inner peripheral surface of the first casing 5A. The first refrigerant path 152A is disposed along the outer peripheral surface of the first stator core 10A. For example, the first refrigerant path 152A is a water jacket.

Second Rotating Electric Machine 1B

As shown in FIG. 3, the second rotating electric machine 1B includes a cylindrical second stator 2B, a second rotor 3B disposed coaxially with the second stator 2B, a second shaft 4B disposed coaxially with the second rotor 3B, and a cylindrical second casing 5B accommodating the second stator 2B and the second rotor 3B. In the second rotating electric machine 1B, the same components as those of the first rotating electric machine 1A are denoted by the same reference numerals and detailed description thereof will be omitted.

The second casing 5B includes an end wall 30B provided at one end portion of the second shaft 4B. The end wall 30B comes into contact with the end wall 30A of the first rotating electric machine 1A in the axial direction. The end wall 30B is coupled to the end wall 30A of the first rotating electric machine 1A by a fastening member such as a bolt. The end wall 30B faces the first coil end 14 in the axial direction.

The second casing 5B includes a second refrigerant path 152B which cools the second stator 2B from the inner peripheral surface of the second casing 5B. The second refrigerant path 152B is disposed along the outer peripheral surface of the second stator core 10B. For example, the second refrigerant path 152B is a water jacket.

Contact Surface 101

The motor unit 100 includes a contact surface 101 in which the first end wall 30A comes into contact with the second end wall 30B in the axial direction. The contact surface 101 is a mating surface (a boundary surface) between the first rotating electric machine 1A and the second rotating electric machine 1B. The first rotating electric machine 1A and the second rotating electric machine 1B have a symmetrical structure in which an imaginary line following the contact surface 101 is a symmetrical axis. That is, the second rotating electric machine 1B has a shape obtained by mirror-inverting the first rotating electric machine 1A.

Surface-matching Fixing Portion 170

As shown in FIG. 1, the motor unit 100 includes a surface-matching fixing portion 170 which is fixed by a fixing member 161 while an axial end surface 35A (hereinafter, referred to as a "first axial end surface 35A") of the first casing 5A comes into contact with an axial end surface 35B (hereinafter, referred to as a "second axial end surface 35B") of the second casing 5B. The surface-matching fixing portion 170 is fixed in the axial direction. The first axial end surface 35A is provided with a positioning hole 172 (a knock pin insertion hole) for positioning the first axial end surface 35A and the second axial end surface 35B (see FIG. 5).

Figure 5:
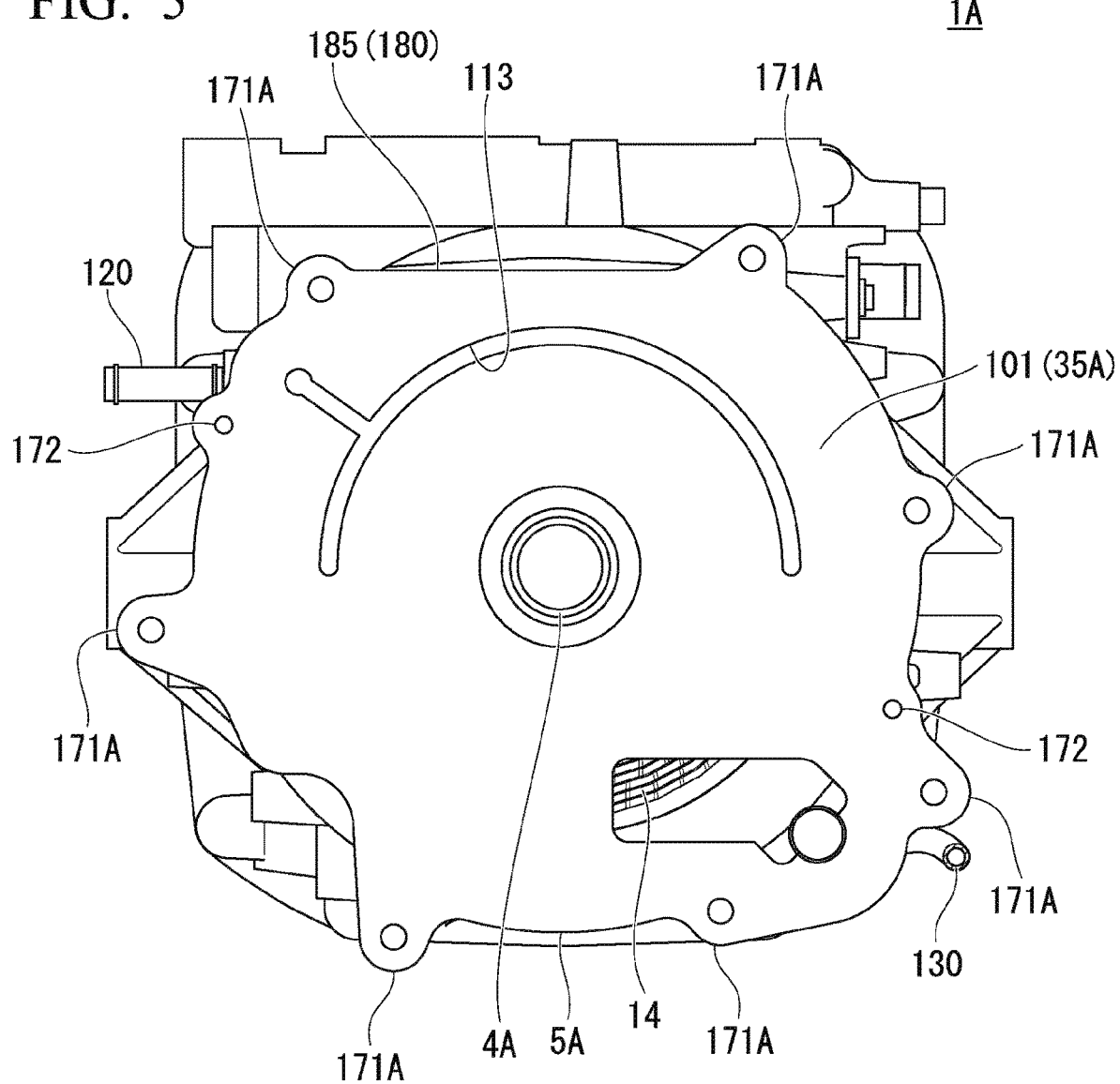
FIG. 5 is a view showing a first rotating electric machine when viewed from the inside of the motor unit in the axial direction in a cross-section v-v of FIG. 4.
Figure 6:
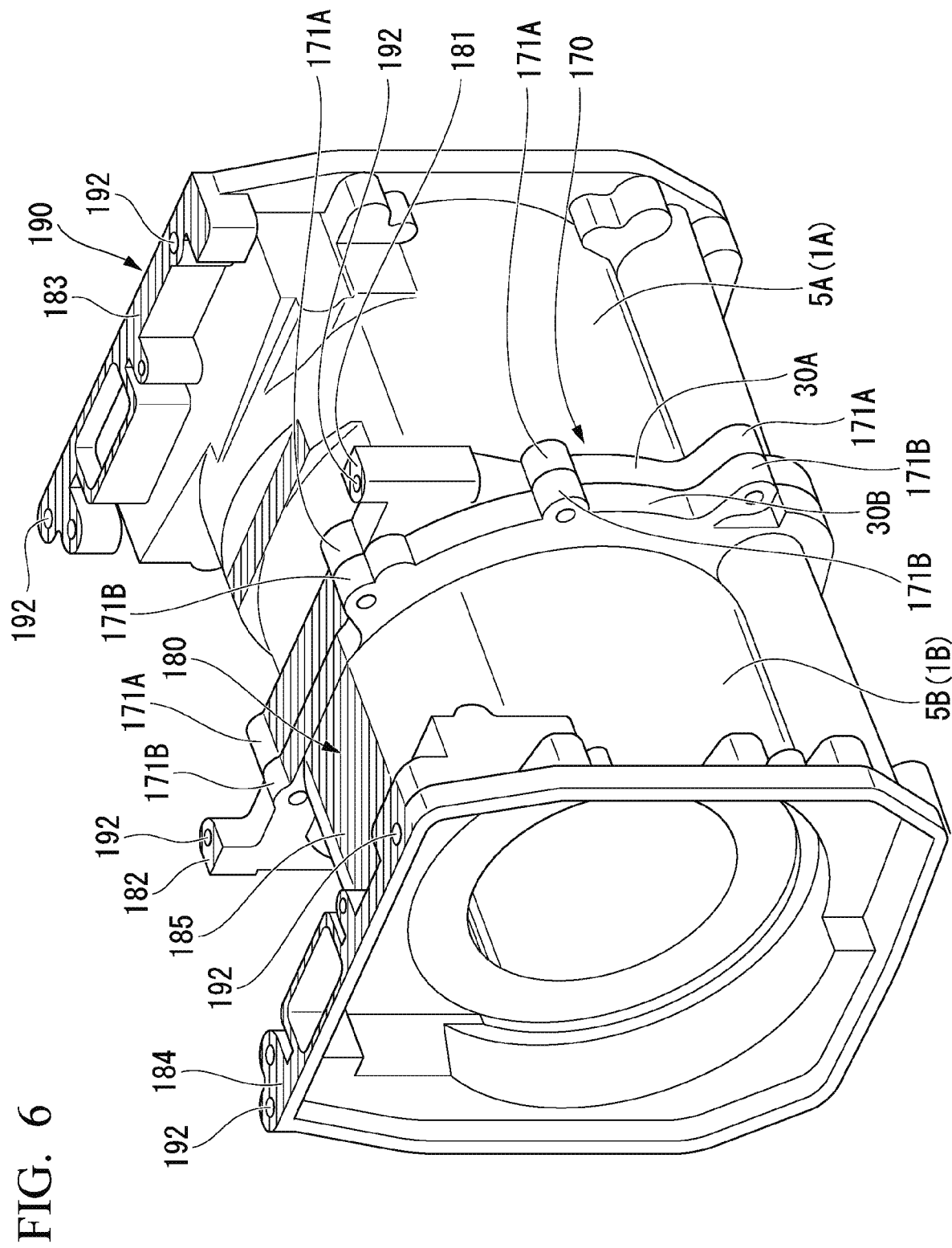
FIG. 6 is a perspective view showing a state in which the drive device is separated from the motor unit according to the embodiment.

As shown in FIG. 6, the surface-matching fixing portion 170 includes a first flange 171A (see FIG. 5) which protrudes outward in the diameter direction from the first axial end surface 35A and a second flange 171B which protrudes outward in the diameter direction from the second axial end surface 35B. The surface-matching fixing portion 170 includes a plurality of (for example, in the embodiment, seven) first flanges 171A (see FIG. 5) and a plurality of (for example, in the embodiment, seven) second flanges 171B corresponding to the first flanges 171A. The surface-matching fixing portion 170 is fastened by a bolt serving as the fixing member 161 while the first flange 171A comes into contact with the second flange 171B (see FIG. 1). Each of the plurality of first flanges 171A is provided with a through-hole through which a male screw portion of a bolt is inserted (or a female screw portion which can be threaded to the male screw portion of the bolt) (see FIG. 5).

Figure 4:
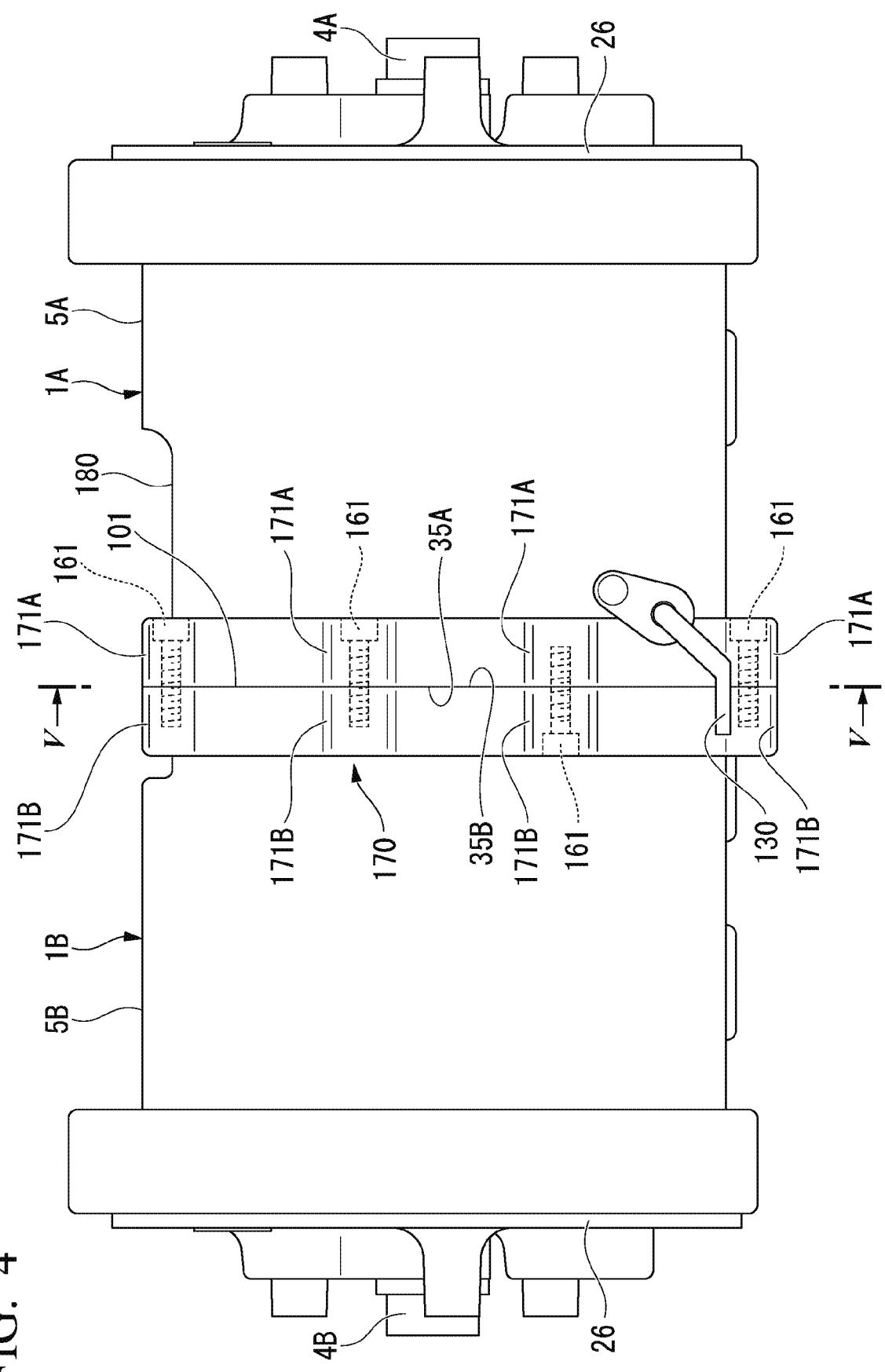
FIG. 4 is a view showing a state in which a drive device is separated from the motor unit according to the embodiment when viewed from the side opposite to the motor unit of FIG. 1.

The plurality of fixing members 161 are arranged at intervals in the circumferential direction of the first rotating electric machine 1A. The plurality of (for example, in the embodiment, seven) fixing members 161 are arranged at substantially the same intervals in the circumferential direction of the first rotating electric machine 1A. For example, the fastening direction of the fixing member 161 may be opposite to the fastening direction of the adjacent fixing member 161 (see FIGS. 1 and 4). Accordingly, since the fastening spaces can be made mutually, the motor unit 100 can be further decreased in size.

In FIG. 5, reference numeral 120 denotes a refrigerant introduction pipe which introduces a refrigerant from the outside, reference numeral 113 denotes a refrigerant supply path which is provided in the contact surface 101, and reference numeral 130 denotes a refrigerant outlet pipe which leads the refrigerant supplied from the refrigerant supply path 113 to the outside. Hereinafter, the refrigerant supply side from the outside in the motor unit 100 (the installation side of the refrigerant introduction pipe 120) is referred to as a front side and a side (the installation side of the refrigerant outlet pipe 130) opposite to the front side is referred to as a rear side.

Drive Device 40

As shown in FIG. 1, the drive device 40 is integrally fixed to a peripheral surface (hereinafter, referred to as a "first peripheral surface") in the diameter direction of the first rotor 3A in the first casing 5A and a peripheral surface (hereinafter, referred to as a "second peripheral surface") in the diameter direction of the second rotor 3B in the second casing 5B.

The drive device 40 is a single drive device which is fixed to the first rotating electric machine 1A and the second rotating electric machine 1B. The drive device 40 is fixed to the first casing 5A and the second casing 5B by a bolt 162.

The drive device 40 covers the first rotating electric machine 1A and the second rotating electric machine 1B from above. In a plan view, the drive device 40 has an outer shape which is larger than the axial length of the first rotating electric machine 1A and the second rotating electric machine 1B (the distance between the outer axial end of the first shaft 4A and the outer axial end of the second shaft 4B) (see FIG. 2).

In a state in which the drive device 40 is fixed to the first peripheral surface and the second peripheral surface (hereinafter, referred to as the "fixed state of the drive device 40"), the drive device 40 covers at least a part of the plurality of fixing members 161. In the fixed state of the drive device 40, the drive device 40 covers two fixing members 161 located at the upper portions of the first casing 5A and the second casing 5B among seven fixing members 161.

As shown in FIG. 3, the drive device 40 includes a substrate 41 which constitutes a printed circuit board having electronic components mounted thereon, a capacitor 42 which is mounted on the substrate 41, power modules 43A and 43B which supply electric power to the motor unit 100, and a housing 44 which accommodates the substrate 41, the capacitor 42, and the power modules 43A and 43B.

The substrate 41 has a plate shape extending in the axial direction.

The capacitor 42 is disposed at the center portion of the drive device 40 in the axial direction. The capacitor 42 is accommodated in the lower space of the substrate 41 inside the housing 44.

A pair of the power modules 43A and 43B is provided with the capacitor 42 interposed therebetween. The power modules 43A and 43B are accommodated in the lower space of the substrate 41 inside the housing 44. The pair of power modules 43A and 43B are a first semiconductor element 43A which supplies electric power to the first rotating electric machine 1A and a second semiconductor element 43B which supplies electric power to the second rotating electric machine 1B. The first semiconductor element 43A faces the first rotating electric machine 1A with the housing 44 interposed therebetween. The second semiconductor element 43B faces the second rotating electric machine 1B with the housing 44 interposed therebetween.

The housing 44 includes a casing 45 which accommodates the substrate 41, the capacitor 42, the first semiconductor element 43A, and the second semiconductor element 43B and a cover lid 46 which is coupled to the casing 45 so as to cover the inside of the casing 45 from above.

Flat Portion 180

As shown in FIG. 1, a portion facing the drive device 40 in the first peripheral surface and the second peripheral surface includes a flat portion 180 extending in a flat shape in the axial direction. The flat portion 180 is disposed within a plane substantially parallel to the horizontal plane. The flat portion 180 is provided at the upper portion of the motor unit 100 from which the drive device 40 is separated (see FIG. 6).

As shown in FIG. 6, the flat portion 180 includes a first flat portion 181 which is provided in the upper portion (the rear upper portion) of the first end wall 30A, a second flat portion 182 which is provided in the upper portion (the front upper portion) of the second end wall 30B, a third flat portion 183 which is provided in the upper portion of the other end portion of the first casing 5A (the upper portion opposite to the first end wall 30A), a fourth flat portion 184 which is provided in the upper portion of the other end portion of the second casing 5B (the upper portion opposite to the second end wall 30B), and a fifth flat portion 185 which is provided across the first casing 5A and the second casing 5B.

The first flat portion 181 and the second flat portion 182 are disposed within substantially the same plane.

The third flat portion 183 is disposed within a plane higher than the first flat portion 181. That is, the third flat portion 183 is farther from the axis of the motor unit 100 of the first flat portion 181.

The third flat portion 183 and the fourth flat portion 184 are disposed within substantially the same plane.

The fifth flat portion 185 is disposed within a plane lower than the first flat portion 181. That is, the fifth flat portion 185 is closer to the axis of the motor unit 100 than the first flat portion 181.

Orthogonal Fixing Portion 190

As shown in FIG. 1, the motor unit 100 includes an orthogonal fixing portion 190 which fixes the drive device 40 in a direction orthogonal to the axial direction across the first peripheral surface and the second peripheral surface. The orthogonal fixing portion 190 fixes the first flat portion 181, the second flat portion 182, the third flat portion 183, and the fourth flat portion 184 (see FIG. 6) to the drive device 40 in the vertical direction. The orthogonal fixing portion 190 fixes a portion other than the fifth flat portion 185 in the flat portion 180 to the drive device 40 in the vertical direction.

The orthogonal fixing portion 190 includes a seat surface 191 on which the head of the bolt 162 can be seated and a female screw portion 192 (see FIG. 6) into which a male screw portion of the bolt 162 can be threaded.

Figure 2:
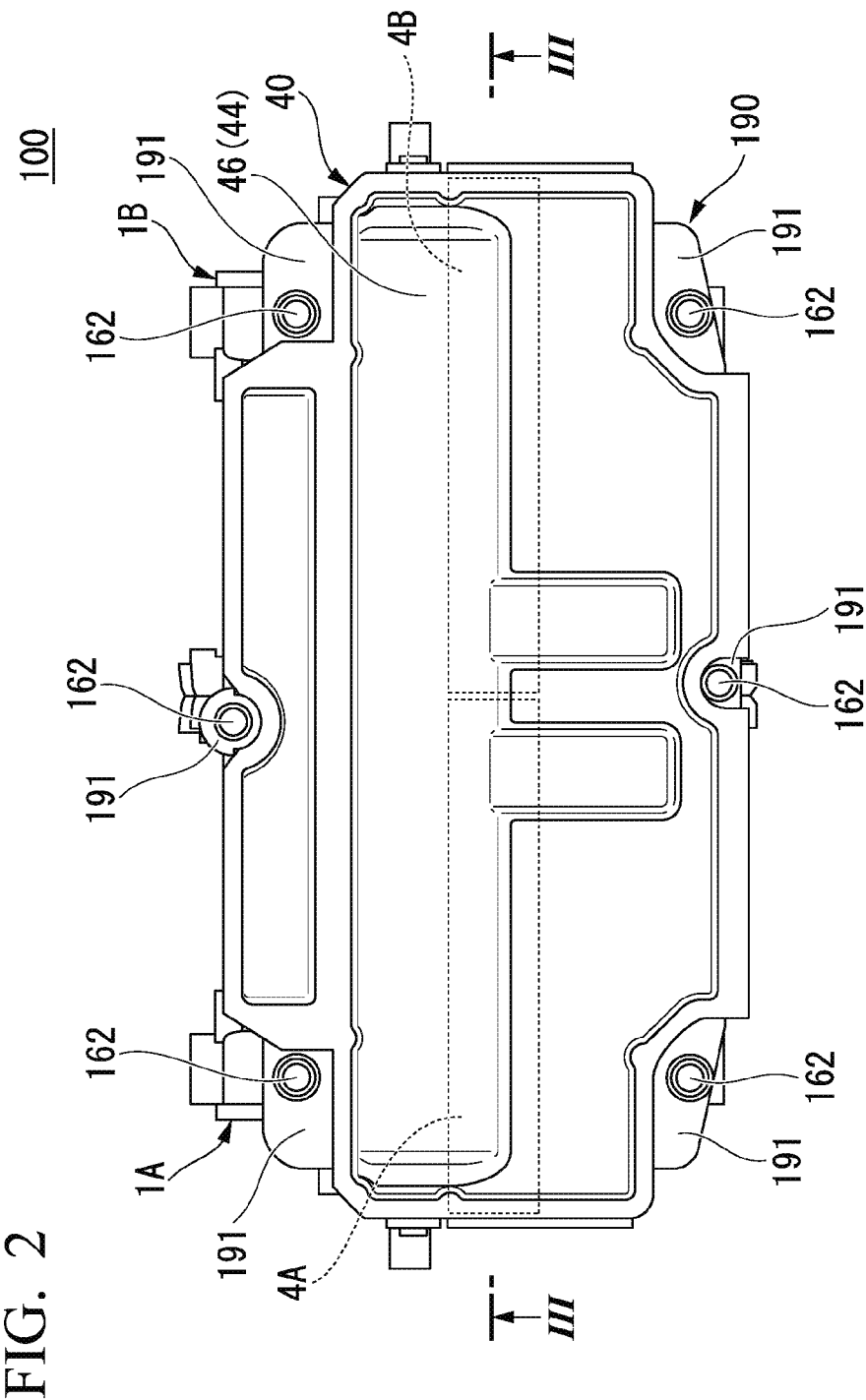
FIG. 2 is a plan view showing the motor unit according to the embodiment.

As shown in FIG. 2, the plurality of (for example, in the embodiment, six) seat surfaces 191 are arranged on the outer peripheral portion of the drive device 40 at intervals.

As shown in FIG. 6, the female screw portion 192 is provided in each of the first flat portion 181, the second flat portion 182, the third flat portion 183, and the fourth flat portion 184. The female screw portion 192 is provided in a portion other than the fifth flat portion 185 in the flat portion 180. The female screw portion 192 is disposed at a position corresponding to the seat surface 191 (see FIG. 2). The female screw portion 192 is disposed at one position of the first flat portion 181, one position of the second flat portion 182, two positions of the third flat portion 183, and two positions of the fourth flat portion 184, so that totally six female screw portions are disposed.

Method of Manufacturing Motor Unit 100

Next, an example of a method of manufacturing the motor unit 100 of the embodiment will be described.

A method of manufacturing the motor unit 100 includes a first step of preparing the first rotating electric machine 1A, the second rotating electric machine 1B, the single drive device 40, and the surface-matching fixing portion 170 and fixing the surface-matching fixing portion 170 by the fixing member 161 and a second step of fixing the drive device 40 across the first peripheral surface and the second peripheral surface after the first step.

Figure 7:
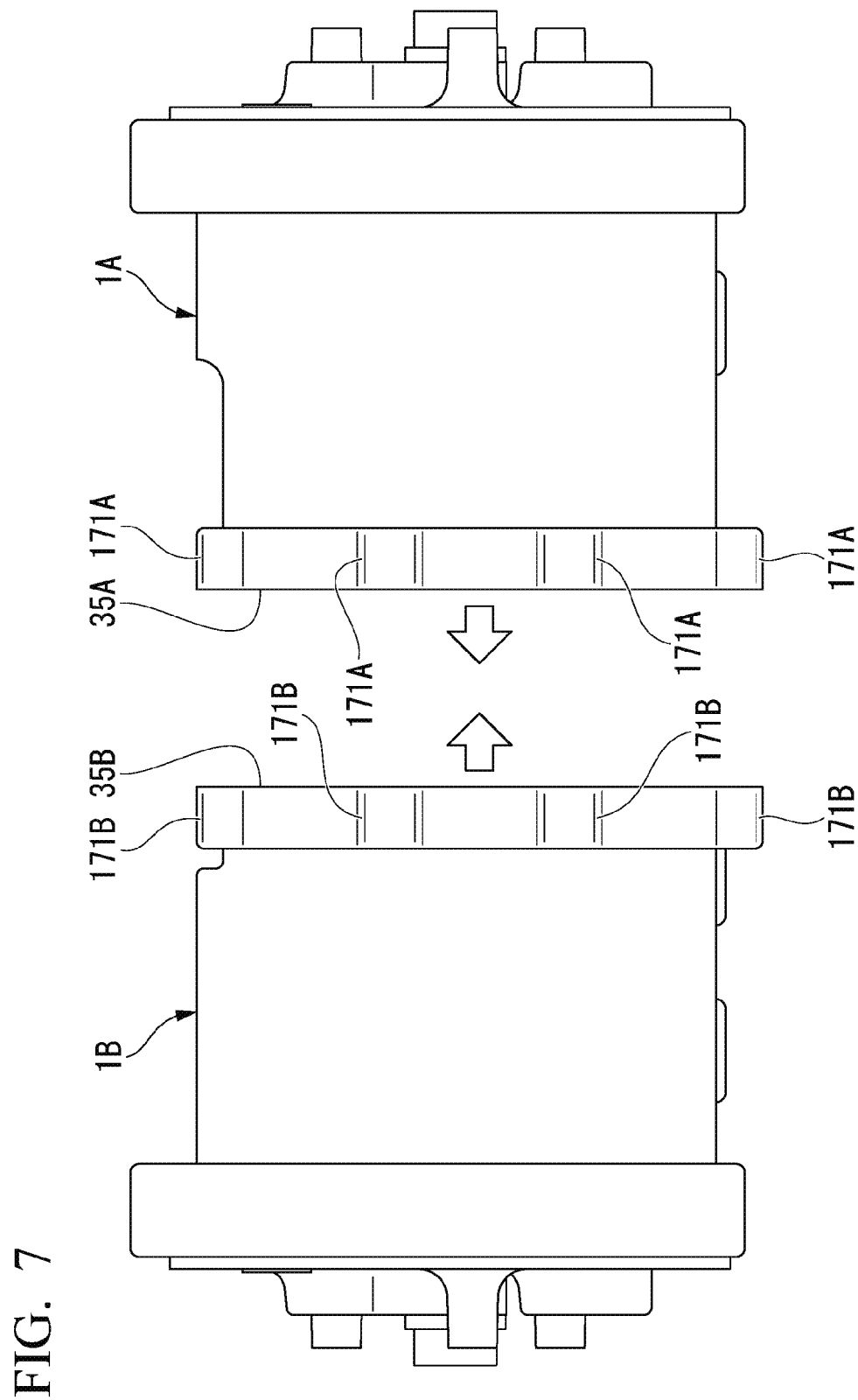
FIG. 7 is a process chart of a motor unit manufacturing method according to the embodiment.
Figure 8:
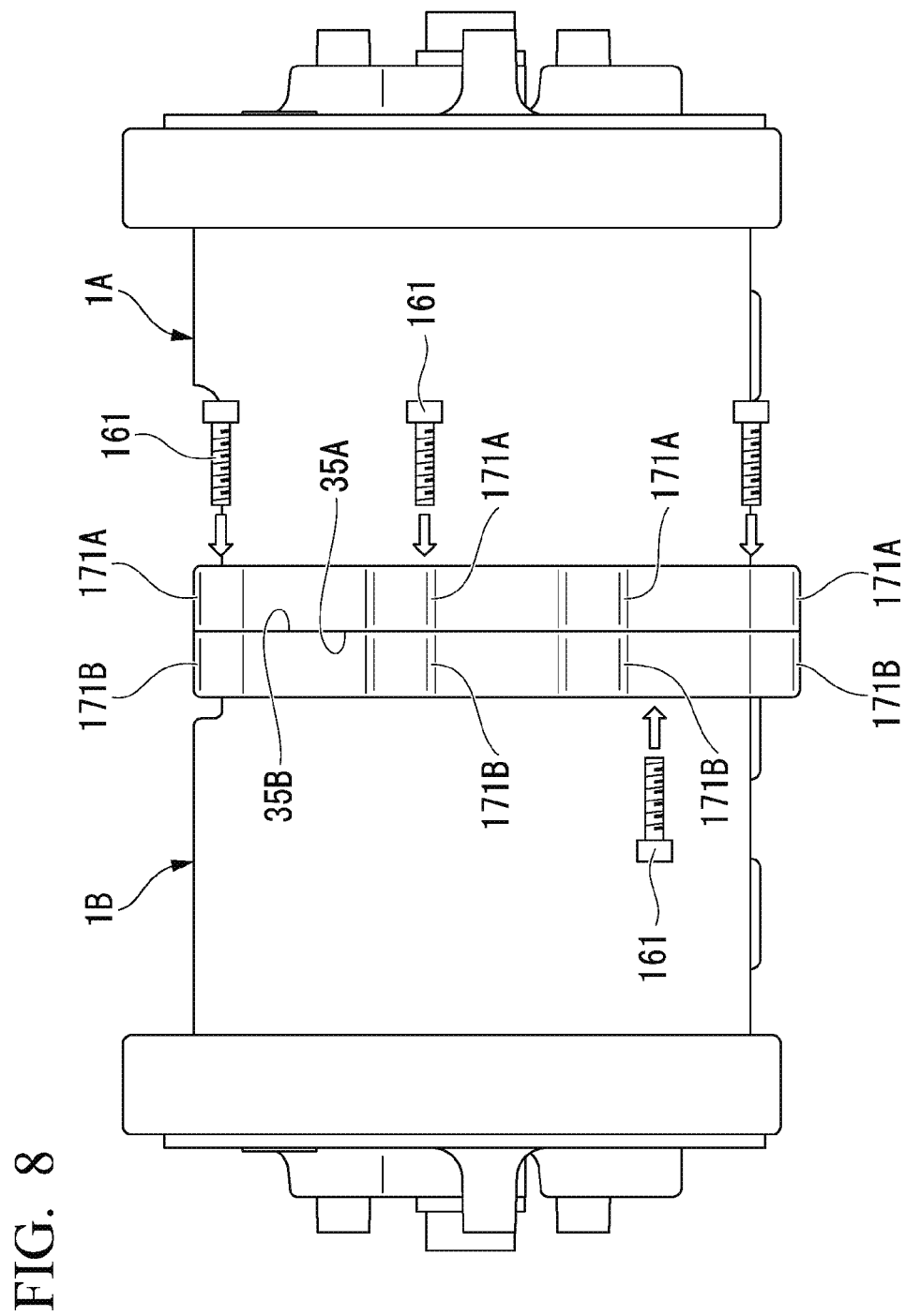
FIG. 8 is a process chart of the motor unit manufacturing method according to the embodiment which is subsequent to FIG. 7.

As shown in FIG. 7, in the first step, the first rotating electric machine 1A and the second rotating electric machine 1B are disposed coaxially and the first axial end surface 35A faces the second axial end surface 35B. Then, as shown in FIG. 8, the surface-matching fixing portion 170 is fixed by the fixing member 161 while the first axial end surface 35A and the second axial end surface 35B come into contact with each other. For example, a male screw portion of a bolt serving as the fixing member 161 is inserted through a through-hole provided in at least one of the first flange 171A and the second flange 171B and a male screw portion is threaded to the female screw portion provided in at least the other of the first flange 171A and the second flange 171B, so that the first flange 171A and the second flange 171B are fastened to each other.

Figure 9:
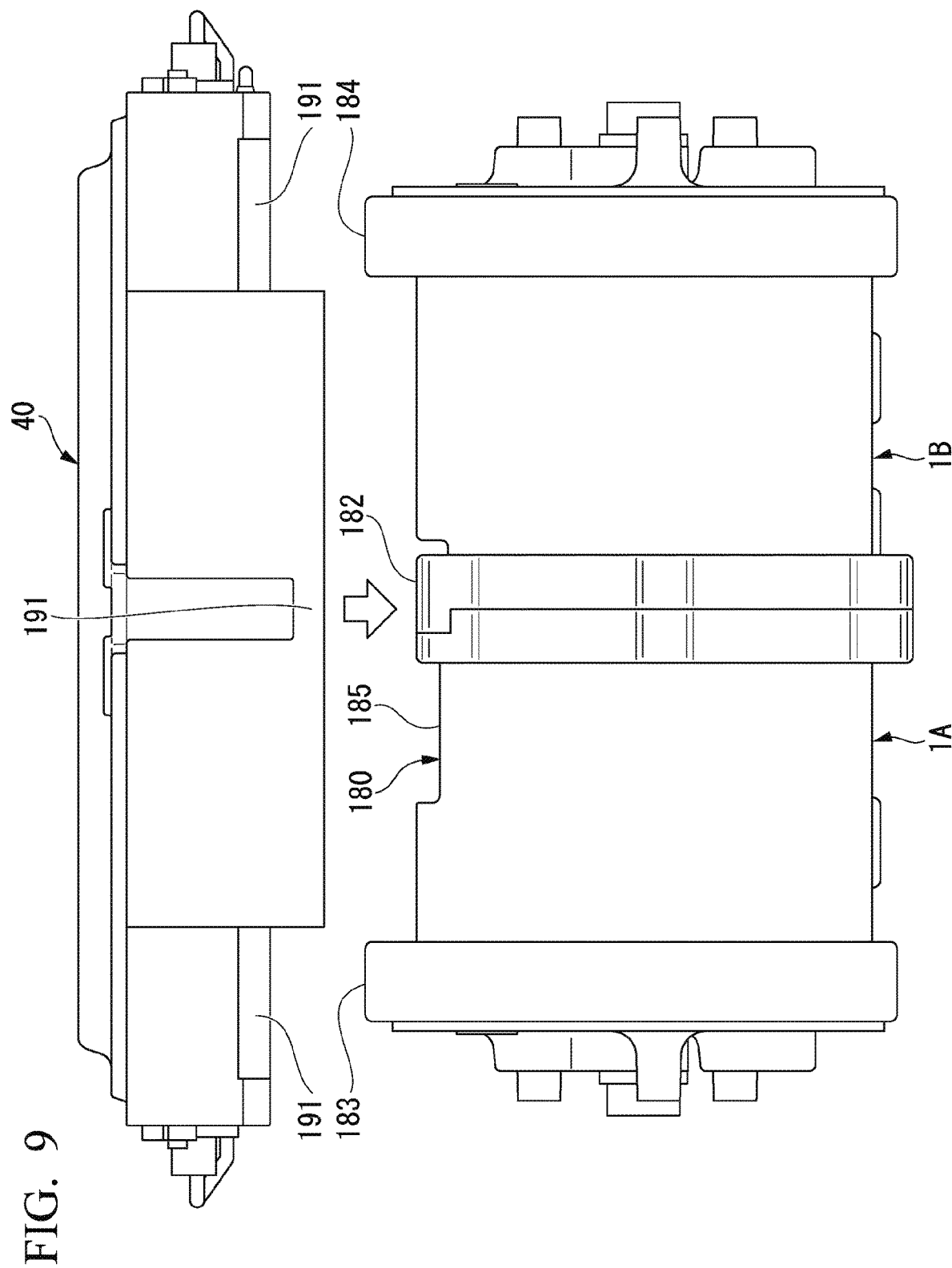
FIG. 9 is a process chart of the motor unit manufacturing method according to the embodiment which is subsequent to FIG. 8.

As shown in FIG. 9, in the second step, the flat portion 180 and the drive device 40 are allowed to face each other. Then, the orthogonal fixing portion 190 is fastened by the bolt 162 while the seat surface 191 of the drive device 40 comes into contact with the flat portion 180 (the flat portions 181 to 184 other than the fifth flat portion 185) (see FIG. 1). For example, the male screw portion of the bolt 162 is inserted through the through-hole provided in the seat surface 191 and the male screw portion of the bolt 162 is threaded into the female screw portion 192 provided in the flat portions 181 to 184, so that the seat surface 191 is fastened to the flat portions 181 to 184.

With the above-described steps, the motor unit 100 is completed.

As described above, the motor unit 100 of the above-described embodiment includes the first rotating electric machine 1A which includes the cylindrical first stator 2A, the first rotor 3A disposed coaxially with the first stator 2A, the first shaft 4A disposed coaxially with the first rotor 3A, and the cylindrical first casing 5A accommodating the first stator 2A and the first rotor 3A, the second rotating electric machine 1B which includes the cylindrical second stator 2B, the second rotor 3B disposed coaxially with the second stator 2B, the second shaft 4B disposed coaxially with the second rotor 3B, and the cylindrical second casing 5B accommodating the second stator 2B and the second rotor 3B, the single drive device 40 which is integrally fixed across the first peripheral surface and the second peripheral surface, and the surface-matching fixing portion 170 which is fixed by the fixing member 161 while the first axial end surface 35A and the second axial end surface 35B come into contact with each other.

According to this configuration, since the surface-matching fixing portion 170 which is fastened by the fixing member 161 while the first axial end surface 35A and the second axial end surface 35B come into contact with each other is provided, the fixing member 161 is disposed in the surface-matching fixing portion 170 (the axial center portion of the motor unit 100). That is, the fixing member 161 does not protrude toward the outside of the axial end portion of the motor unit 100.

Thus, the motor unit 100 can be decreased in size. In addition, since the single drive device 40 which is integrally fixed across the first peripheral surface and the second peripheral surface is provided, the drive device 40 does not protrude toward the outside of the axial end portion of the motor unit 100. Thus, it is possible to realize a decrease in size of the motor unit 100 including two rotating electric machines 1A and 1B and the single drive device 40.

In the above-described embodiment, since the surface-matching fixing portion 170 is fixed in the axial direction, the first casing 5A and the second casing 5B can be connected to each other in the axial direction. Additionally, since a portion facing the drive device 40 in the first peripheral surface and the second peripheral surface includes a planar flat portion 180 extending in the axial direction, at least a part of the drive device 40 can be disposed along the flat portion 180 and hence the motor unit 100 can be also decreased in size in the diameter direction. In addition, since the orthogonal fixing portion 190 which fixes the drive device 40 in a direction orthogonal to the axial direction across the first peripheral surface and the second peripheral surface is further provided, the first peripheral surface and the second peripheral surface can be connected to the drive device 40 in a direction orthogonal to the axial direction. Thus, it is possible to further decrease the size of the motor unit 100 by the fixing in the axial direction and the fixing in a direction orthogonal to the axial direction.

In the above-described embodiment, since the surface-matching fixing portion 170 includes the first flange 171A which protrudes outward in the diameter direction from the first axial end surface 35A and the second flange 171B which protrudes outward in the diameter direction from the second axial end surface 35B and the first flange 171A and the second flange 171B are fastened to each other by a bolt serving as the fixing member 161 while both flanges come into contact with each other, thus the following effects are obtained. Due to the surface matching between the first flange 171A and the second flange 171B and the bolt fastening, the more reliable connection can be performed and the assembling workability can be improved. At this time, the drive device 40 of the surface-matching fixing portion 170 may be connected by one first flange 171A and one second flange 171B protruding outward in the diameter direction opposite to that of the first flange 171A (see FIG. 6). That is, the fixing position of the drive device 40 in the surface-matching fixing portion 170 may be one position in the first rotating electric machine 1A and one position in the second rotating electric machine 1B. Accordingly, the fixing strength balance of the drive device 40 can be made uniform as compared with a structure in which the fixing position of the drive device 40 in the surface-matching fixing portion 170 is set as two positions only for any one of the first rotating electric machine 1A and the second rotating electric machine 1B or a structure in which the fixing position is set as two positions for each of the first rotating electric machine 1A and the second rotating electric machine 1B.

In the above-described embodiment, since the first rotating electric machine 1A and the second rotating electric machine 1B are disposed coaxially, the motor unit 100 can be made as small as possible. Additionally, since the plurality of fixing members 161 are disposed at intervals in the circumferential direction of the first rotating electric machine 1A, it is possible to prevent a part of the surface-matching fixing portion 170 from excessively increasing in size. Thus, it is possible to further decrease the size of the motor unit 100.

In the above-described embodiment, since the drive device 40 covers at least a part of the plurality of fixing members 161 in the fixed state of the drive device 40, the motor unit 100 can be easily decreased in size as compared with a case in which the entire fixing member 161 protrudes outward in the fixed state of the drive device 40. At this time, it is possible to allow the drive device 40 to approach the first casing 5A and the second casing 5B by widening a circumferential gap between the plurality of fixing members 161 covered with the drive device 40. That is, it is possible to decrease the radial distance between each of the first casing 5A and the second casing 5B and the drive device 40. Accordingly, it is possible to further decrease the size of the motor unit 100.

In the above-described embodiment, since the first step of fixing the surface-matching fixing portion 170 by the fixing member 161 and the second step of fixing the drive device 40 across the first peripheral surface and the second peripheral surface after the first step are provided, it is possible to improve the assembling workability of the motor unit 100 and to realize a decrease in size thereof due to the relation to the assembly procedure and the configuration.

Figure 10:
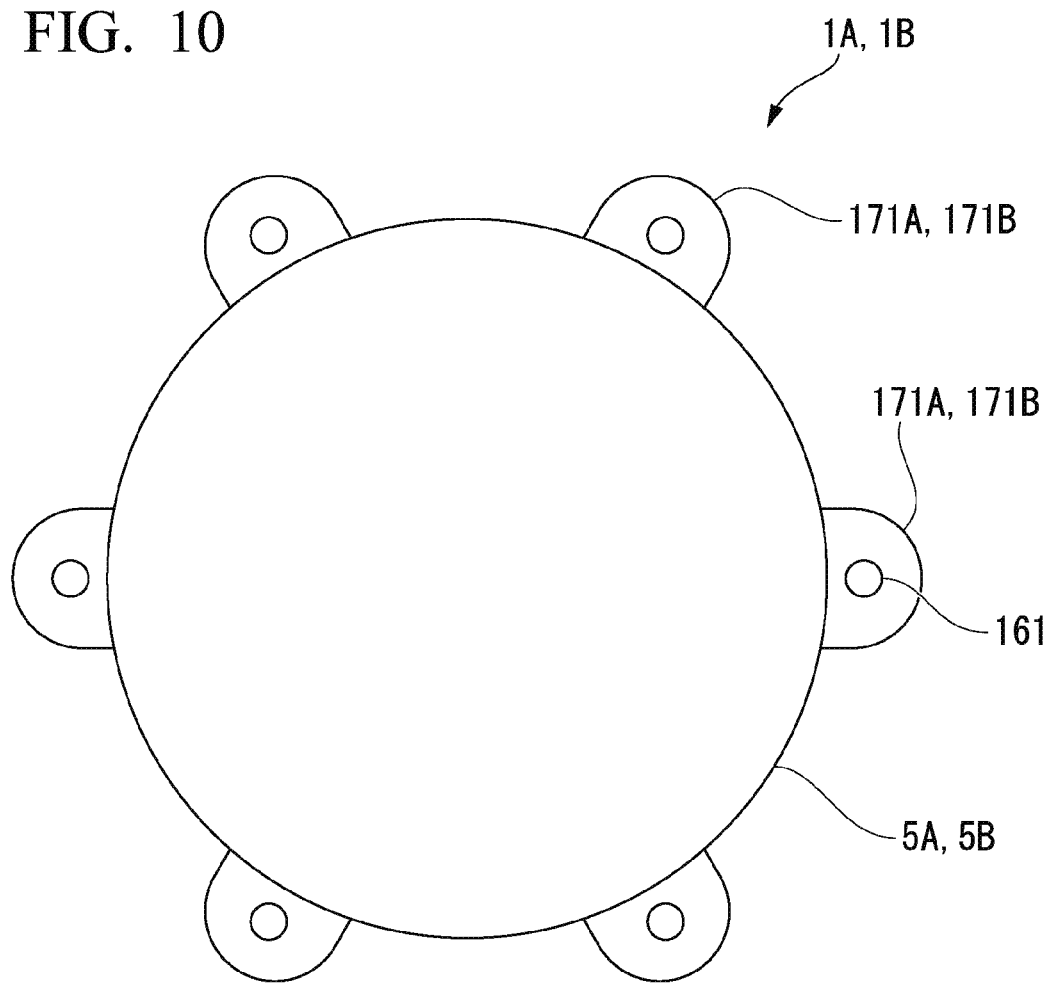
FIG. 10 is a diagram illustrating an arrangement example of fixing members of the motor unit according to the embodiment.
Figure 11:
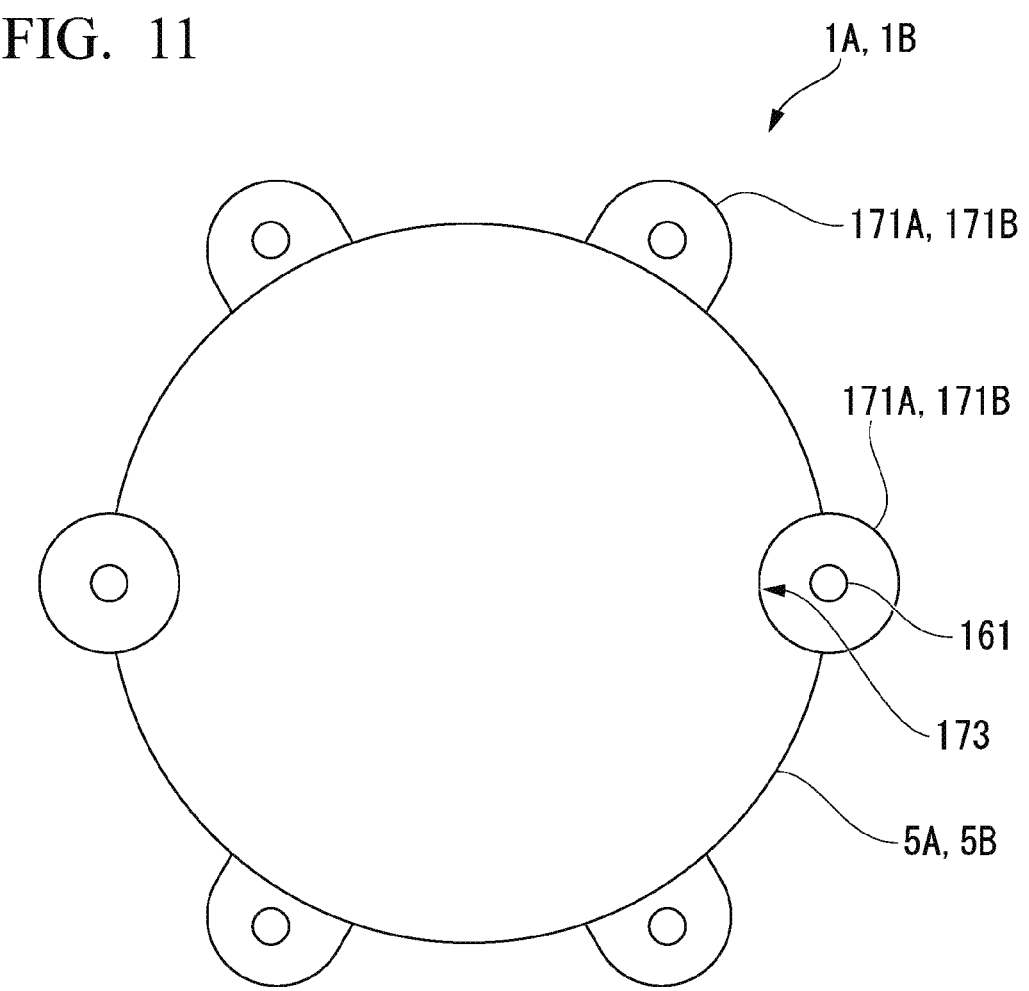
FIG. 11 is a diagram illustrating an arrangement example of fixing members of a motor unit according to a modified example of the embodiment.

In the above-described embodiment, a configuration in which the fixing member 161 is disposed at the outside of the outer peripheries of the first casing 5A and the second casing 5B in the diameter direction (see FIG. 10) has been described, but the present invention is not limited thereto. For example, as shown in FIG. 11, a part of the fixing member 161 may be disposed on the outer peripheries of the first casing 5A and the second casing 5B or may be disposed at the inside of the outer peripheries thereof in the diameter direction. In this case, a concave portion 173 may be provided in the outer peripheries of the first casing 5A and the second casing 5B to provide a relief structure for the fixing member 161 itself or a tool for fixing the fixing member 161 or the like. Accordingly, it is possible to further decrease the size of the motor unit 100.

In the above-described embodiment, a configuration in which the first rotating electric machine 1A and the second rotating electric machine 1B are disposed coaxially has been described, but the present invention is not limited thereto. For example, the first rotating electric machine 1A and the second rotating electric machine 1B may be disposed in different axes. For example, the first shaft 4A and the second shaft 4B may be offset from each other.

In the above-described embodiment, a configuration in which the male screw portion of the bolt serving as the fixing member 161 is inserted through the through-hole provided in one of the first flange 171A and the second flange 171B and the male screw portion is threaded into the female screw portion provided in the other of the first flange 171A and the second flange 171B so that the first flange 171A and the second flange 171B are fastened to each other has been described, but the present invention is not limited thereto. For example, the male screw portion of the bolt serving as the fixing member 161 may be inserted through the through-hole provided in each of the first flange 171A and the second flange 171B so as to protrude and the male screw portion may be threaded into a nut so that the first flange 171A and the second flange 171B are fastened to each other.

In the above-described embodiment, a configuration in which the male screw portion of the bolt 162 is inserted through the through-hole provided in the seat surface 191 and the male screw portion of the bolt 162 is threaded into the female screw portion provided in each of the flat portions 181 to 184 so that the seat surface 191 is fastened to each of the flat portions 181 to 184 has been described, but the present invention is not limited thereto. For example, the male screw portion of the bolt 162 may be inserted through the through-hole provided in each of the seat surface 191 and the flat portion so as to protrude and the male screw portion of the bolt 162 may be threaded into the nut so that the seat surface 191 and the flat portion are fastened to each other.

In the above-described embodiment, a configuration in which the surface-matching fixing portion 170 is fastened by a bolt serving as the fixing member 161 has been described, but the present invention is not limited thereto. For example, the surface-matching fixing portion 170 may be press-inserted by a pin or the like. That is, the surface-matching fixing portion 170 is not limited to bolt fastening and may be fixed by press-fitting, bonding, or the like.

In the above-described embodiment, a configuration in which the orthogonal fastening portion 190 is fastened by the bolt 162 has been described, but the present invention is not limited thereto. For example, the orthogonal fastening portion 190 may be press-inserted by a pin or the like. That is, the orthogonal fastening portion 190 is not limited to bolt fastening, and may be fixed by press-fitting, bonding, or the like.

In the above-described embodiment, a configuration in which the motor unit 100 is disposed so that the shafts 4A and 4B follow the horizontal direction has been described, but the present invention is not limited thereto. For example, the motor unit 100 may be disposed so that the shafts 4A and 4B follow the vertical direction. The arrangement of the shafts 4A and 4B can be changed to an arbitrary direction in response to the design specification.

In the above-described embodiment, a configuration in which the plurality of fixing members 161 are arranged at substantially the same intervals in the circumferential direction has been described, but the present invention is not limited thereto. For example, the arrangement intervals in the circumferential direction of the fixing members 161 need not be the same and may be unequal.

In the above-described embodiment, a configuration in which the coil is the SC winding has been described, but the present invention is not limited thereto. For example, the coil may be a continuous winding or the like other than the SC winding.

In the above-described embodiment, an example has been described in which the rotating electric machine is a traveling motor mounted on a vehicle such as a hybrid vehicle or an electric vehicle, but the present invention is not limited thereto. For example, the rotating electric machine may be a motor for power generation or other uses or a rotating electric machine (including a generator) other than for a vehicle.

Although the preferred embodiments of the present invention have been described above, the present invention is not limited thereto and additions, omissions, substitutions, and other modifications of the configuration can be made without departing from the spirit of the invention. Furthermore, the above-described modifications can be appropriately combined.

What is claimed is:

1. A motor unit comprising:
   a first rotating electric machine which includes a cylindrical first stator, a first rotor disposed coaxially with the first stator, a first shaft disposed coaxially with the first rotor, and a cylindrical first casing accommodating the first stator and the first rotor;
   a second rotating electric machine which includes a cylindrical second stator, a second rotor disposed coaxially with the second stator, a second shaft disposed coaxially with the second rotor, and a cylindrical second casing accommodating the second stator and the second rotor;
   a single drive device which is integrally fixed across a peripheral surface in a diameter direction of the first rotor in the first casing and a peripheral surface in a diameter direction of the second rotor in the second casing; and
   a surface-matching fixing portion which is fixed by a fixing member while an axial end surface of the first casing comes into contact with an axial end surface of the second casing,
   wherein the surface-matching fixing portion is fixed in an axial direction,
   wherein a portion facing the drive device in the peripheral surface of the first casing and the peripheral surface of the second casing has a planar flat portion extending in the axial direction, and
   wherein the motor unit further comprises an orthogonal fixing portion which fixes the drive device in a direction orthogonal to the axial direction across the peripheral surface of the first casing and the peripheral surface of the second casing.

2. The motor unit according to claim 1,
   wherein the surface-matching fixing portion includes a first flange which protrudes outward in the diameter direction from an axial end surface of the first casing and a second flange which protrudes outward in the diameter direction from an axial end surface of the second casing, and
   wherein the first flange and the second flange are fastened by a bolt serving as the fixing member while both flanges come into contact with each other.

3. The motor unit according to claim 1,
   wherein the first rotating electric machine and the second rotating electric machine are disposed coaxially, and
   wherein a plurality of the fixing members are arranged at intervals in a circumferential direction of the first rotating electric machine.

4. The motor unit according to claim 3,
   wherein the drive device covers at least a part of the plurality of fixing members while the drive device is fixed.

5. A motor unit manufacturing method comprising:
   a first step of preparing a first rotating electric machine which includes a cylindrical first stator, a first rotor disposed coaxially with the first stator, a first shaft disposed coaxially with the first rotor, and a cylindrical first casing accommodating the first stator and the first rotor, a second rotating electric machine which includes a cylindrical second stator, a second rotor disposed coaxially with the second stator, a second shaft disposed coaxially with the second rotor, and a cylindrical second casing accommodating the second stator and the second rotor, a single drive device which has a size across a peripheral surface in a diameter direction of the first rotor in the first casing and a peripheral surface in a diameter direction of the second rotor in the second casing, and a surface-matching fixing portion which is fixed by a fixing member while an axial end surface of the first casing comes into contact with an axial end surface of the second casing, and fixing the surface-matching fixing portion by the fixing member; and
   a second step of fixing the drive device across the peripheral surface of the first casing and the peripheral surface of the second casing after the first step,
   wherein the surface-matching fixing portion is fixed in an axial direction,
   wherein a portion facing the drive device in the peripheral surface of the first casing and the peripheral surface of the second casing has a planar flat portion extending in the axial direction, and
   wherein the motor unit manufacturing method further comprises fixing, using an orthogonal fixing portion, the drive device in a direction orthogonal to the axial direction across the peripheral surface of the first casing and the peripheral surface of the second casing.

* * * * *